United States Patent
Tanner

(10) Patent No.: US 7,453,660 B2
(45) Date of Patent: Nov. 18, 2008

(54) SHOCK FEED FORWARD ADAPTIVE FILTERS

(75) Inventor: Brian K. Tanner, San Jose, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 120 days.

(21) Appl. No.: 11/421,440

(22) Filed: May 31, 2006

(65) Prior Publication Data

US 2007/0279792 A1 Dec. 6, 2007

(51) Int. Cl.
*G11B 17/00* (2006.01)
*G11B 27/36* (2006.01)

(52) U.S. Cl. .......................................... 360/69; 360/31
(58) Field of Classification Search ........................ None
See application file for complete search history.

(56) References Cited

U.S. PATENT DOCUMENTS

| | | | |
|---|---|---|---|
| 4,549,232 A | 10/1985 | Axmear | |
| 4,614,986 A | 9/1986 | La Budde | |
| 4,706,250 A | 11/1987 | Patell et al. | |
| 4,811,124 A | 3/1989 | Dujari et al. | |
| 4,829,249 A | 5/1989 | Matsushita | |
| 4,833,679 A | 5/1989 | Anderson et al. | |
| 4,881,136 A | 11/1989 | Shiraishi et al. | |
| 4,993,029 A | 2/1991 | Galbraith et al. | |
| 5,068,858 A | 11/1991 | Blaum et al. | |
| 5,109,304 A | 4/1992 | Pederson | |
| 5,150,050 A | 9/1992 | Genheimer et al. | |
| 5,267,241 A | 11/1993 | Kowal | |
| 5,339,204 A | 8/1994 | James et al. | |
| 5,424,638 A | 6/1995 | Huber | |
| 5,444,719 A | 8/1995 | Cox et al. | |
| 5,455,536 A | 10/1995 | Kono et al. | |
| 5,487,077 A | 1/1996 | Hassner et al. | |
| 5,532,586 A | 7/1996 | Ishikawa | |
| 5,563,746 A | 10/1996 | Bliss | |
| 5,568,331 A | 10/1996 | Akagi et al. | |

(Continued)

FOREIGN PATENT DOCUMENTS

EP 769774 4/1997

(Continued)

OTHER PUBLICATIONS

Al Mamun, A., et al., "Efficient position encoding in hard disk drive using dual frequency servo bursts", *The 27th Annual Conference of the IEEE Industrial Electronics Society, 2001. IECON '01*. vol. 1, (2001),609-614.

(Continued)

*Primary Examiner*—Jason C Olson
(74) *Attorney, Agent, or Firm*—Schwegman, Lundberg & Woessner, P.A.

(57) ABSTRACT

A disk drive device has a shock sensor that detects mechanical shocks to a disk drive device to provide a shock output signal representative of such mechanical shocks. The shock output signal may be filtered to pass signals having a low frequency component of approximately between 1 and 4 KHz. Low frequency mechanical disturbances may be compensated for during writing to a track on the disk drive as a function of such low frequency component. In one embodiment, higher frequency shocks may be processed on a separate shock channel to inhibit or allow write operations. Different filters may be used on each of the shock channels.

16 Claims, 5 Drawing Sheets

U.S. PATENT DOCUMENTS

| | | | |
|---|---|---|---|
| 5,615,064 A | 3/1997 | Blank et al. | |
| 5,659,436 A | 8/1997 | Yarmchuk et al. | |
| 5,663,846 A | 9/1997 | Masuoka et al. | |
| 5,696,645 A * | 12/1997 | Laughlin | 360/75 |
| 5,751,947 A | 5/1998 | Arakawa | |
| 5,781,363 A | 7/1998 | Rowan et al. | |
| 5,792,947 A | 8/1998 | Pogrebinsky et al. | |
| 5,815,338 A | 9/1998 | Tsunekawa et al. | |
| 5,867,341 A | 2/1999 | Volz et al. | |
| 6,057,926 A | 5/2000 | Horai | |
| 6,081,112 A | 6/2000 | Carobolante et al. | |
| 6,091,564 A | 7/2000 | Codilian et al. | |
| 6,101,227 A | 8/2000 | Glover | |
| 6,175,459 B1 | 1/2001 | Tomita | |
| 6,195,220 B1 | 2/2001 | Ellis et al. | |
| 6,198,584 B1 | 3/2001 | Codilian et al. | |
| 6,204,629 B1 | 3/2001 | Rote et al. | |
| 6,204,989 B1 | 3/2001 | Hryina et al. | |
| 6,219,814 B1 | 4/2001 | Coker et al. | |
| 6,243,224 B1 | 6/2001 | Sacks et al. | |
| 6,259,576 B1 | 7/2001 | Ahn | |
| 6,292,316 B1 | 9/2001 | Dietzel et al. | |
| 6,292,913 B1 | 9/2001 | Son | |
| 6,363,214 B1 | 3/2002 | Merello et al. | |
| 6,411,459 B1 | 6/2002 | Belser et al. | |
| 6,429,995 B1 | 8/2002 | Dobbek et al. | |
| 6,469,849 B1 | 10/2002 | Ellis et al. | |
| 6,490,111 B1 | 12/2002 | Sacks | |
| 6,510,014 B2 * | 1/2003 | Kikuta et al. | 360/60 |
| 6,519,107 B1 | 2/2003 | Ehrlich et al. | |
| 6,522,488 B2 | 2/2003 | Sasamoto et al. | |
| 6,597,532 B1 * | 7/2003 | Usui et al. | 360/97.03 |
| 6,608,477 B2 | 8/2003 | Sacks et al. | |
| 6,631,046 B2 | 10/2003 | Szita et al. | |
| 6,643,082 B1 | 11/2003 | Belser | |
| 6,651,213 B2 | 11/2003 | Hassner et al. | |
| 6,704,156 B1 | 3/2004 | Baker et al. | |
| 6,744,577 B1 * | 6/2004 | Guo et al. | 360/31 |
| 6,760,179 B2 | 7/2004 | Moon et al. | |
| 6,760,184 B1 | 7/2004 | Cunningham | |
| 6,785,075 B2 | 8/2004 | Bryant et al. | |
| 6,785,084 B2 | 8/2004 | Szita | |
| 6,885,514 B1 | 4/2005 | Codilian et al. | |
| 6,898,046 B2 * | 5/2005 | Sri-Jayantha et al. | 360/77.02 |
| 6,906,884 B2 | 6/2005 | Yasuna et al. | |
| 6,937,422 B2 * | 8/2005 | Dang et al. | 360/77.02 |
| 6,940,679 B1 | 9/2005 | McNeil et al. | |
| 6,943,977 B2 | 9/2005 | Yatsu | |
| 6,961,203 B1 | 11/2005 | Baker | |
| 7,023,631 B2 | 4/2006 | Zhang et al. | |
| 2001/0019463 A1 | 9/2001 | Drouin | |
| 2002/0141101 A1 | 10/2002 | Brittner et al. | |
| 2003/0065469 A1 | 4/2003 | Pedrazzini et al. | |
| 2003/0161065 A1 | 8/2003 | Yatsu | |
| 2003/0179482 A1 | 9/2003 | Fukushima | |
| 2003/0189781 A1 | 10/2003 | Dunn | |
| 2003/0214747 A1 | 11/2003 | Baral | |
| 2004/0061968 A1 | 4/2004 | Fukushima et al. | |
| 2004/0075935 A1 | 4/2004 | Yatsu | |
| 2004/0114270 A1 | 6/2004 | Chung et al. | |
| 2004/0123025 A1 | 6/2004 | Chainer et al. | |
| 2004/0145825 A1 | 7/2004 | Miles | |
| 2004/0201914 A1 | 10/2004 | Ikeda et al. | |
| 2004/0264019 A1 | 12/2004 | Curtiss et al. | |
| 2004/0264031 A1 | 12/2004 | Yatsu | |
| 2005/0013037 A1 | 1/2005 | Tanner | |
| 2005/0052767 A1 | 3/2005 | Miyata | |
| 2005/0057833 A1 * | 3/2005 | Hirano et al. | 360/31 |
| 2005/0073770 A1 | 4/2005 | Ehrlich et al. | |
| 2005/0078403 A1 | 4/2005 | Mizukoshi | |
| 2005/0082996 A1 | 4/2005 | Luebbe | |
| 2005/0099720 A1 | 5/2005 | Chung | |
| 2005/0117240 A1 | 6/2005 | Codilian et al. | |
| 2005/0117245 A1 | 6/2005 | Park et al. | |
| 2005/0152058 A1 | 7/2005 | Schmidt et al. | |
| 2005/0174679 A1 | 8/2005 | Chan et al. | |
| 2005/0207051 A1 | 9/2005 | Fukushima | |
| 2005/0218853 A1 | 10/2005 | Kokami | |
| 2005/0237646 A1 | 10/2005 | Ehrlich | |
| 2005/0237653 A1 | 10/2005 | Ehrlich | |
| 2005/0237656 A1 | 10/2005 | Ehrlich | |
| 2005/0237658 A1 | 10/2005 | Ehrlich | |
| 2005/0237659 A1 | 10/2005 | Ehrlich | |
| 2005/0248872 A1 | 11/2005 | Ehrlich | |
| 2005/0254160 A1 | 11/2005 | Bandic et al. | |
| 2007/0217052 A1 * | 9/2007 | Semba et al. | 360/75 |

FOREIGN PATENT DOCUMENTS

| | | |
|---|---|---|
| EP | 962915 | 12/1999 |
| GB | 2361576 | 10/2001 |
| JP | 62188015 | 8/1987 |
| JP | 63211116 | 9/1988 |
| JP | 3214474 | 9/1991 |
| JP | 2001014816 | 1/2001 |
| JP | 2002288956 | 10/2002 |
| JP | 2005352536 | 12/2002 |
| JP | 2003-008590 | 1/2003 |
| JP | 2003085904 | 3/2003 |
| JP | 2005174429 | 6/2005 |
| JP | 2005190509 | 7/2005 |
| WO | WO-9741558 | 11/1997 |

OTHER PUBLICATIONS

Al Mamun, A., et al., "Measurement of position offset in hard disk drive using dual frequency servo bursts", *IEEE Transactions on Instrumentation and Measurement*, 52(6), (2003),1870-1880.

Gurumurthi, Sudhanva, et al., "DRPM: Dynamic Speed Control for Power Management in Server Class Disks", *Proceedings of the 30th Annual International Symposium on Computer Architecture*, (2003),169-181.

Hughes, E C., et al., "Characterization of three servo patterns for position error signal generation in hard drives", *Proceedings of the 2003 American Control Conference*, (Jun. 2003),4317-4322.

Matsuoka, Kaoru, "Servo track writing of HDDs using magnetic printing technology", *JSME News*, 16(1), The Japan Society of Mechanical Engineers,(2005),1-10.

Sacks, Alexei, "Positive error signal generation in magnetic disk drives", *(Presentation)—PhD Thesis of Alexei Sacks, Carnegie-Mellon University*, (1995),1-37.

Schultz, M D., et al., "A self-servowrite clocking process", *IEEE Transactions on Magnetics*, 37(4), (Jul. 2001),1878-1880.

Sereinig, W., "Motion control: the power side of disk drives", *Proceedings of the International Conference on Computer Design: VLSI in Computers & Processors*, (2002),1-6.

Takaishi, K., et al., "Hard disk drive servo technology for media-level servo track writing", *IEEE Transactions on Magnetics*, 39(2), (Mar. 2003),851-856.

Ye, Haibei, et al., "Radial error propagation issues in self-servo track writing technology", *IEEE Transactions on Magnetics*, 38(5), (Sep. 2002),2180-2182.

* cited by examiner

SHOCK FEED FORWARD ADAPTIVE FILTERS

BACKGROUND

A disk drive is an information storage device. A disk drive includes one or more disks clamped to a rotating spindle, and at least one head for reading information representing data from and/or writing data to the surfaces of each disk. The head is supported by a suspension coupled to an actuator that may be driven by a voice coil motor. Control electronics in the disk drive provide electrical pulses to the voice coil motor to move the head to desired positions on the disks to read and write the data in circular tracks on the disk, and to park the head in a safe area when not in use or when otherwise desired for protection of the disk drive.

Certain mechanical shocks to disk drives can cause the head or heads to write data outside an intended track if the shock occurs during or just prior to a write. Adjacent user track data can become corrupted if such writes are allowed to continue. Some disk drives detect shocks, sometimes referred to as sharp jerk events, and attempt to prevent the writing of data when certain shocks are detected.

Not all shocks may result in corruption of adjacent track data if writes are allowed to continue. However, such writes may result in data being written off center from the track, making it more difficult to read.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

The description set out herein illustrates the various embodiments of the invention and such description is not intended to be construed as limiting in any manner.

DETAILED DESCRIPTION

The present application describes the general operation of a disk drive device, followed by a device and method for compensating for low frequency shocks while writing data.

Figure 1:
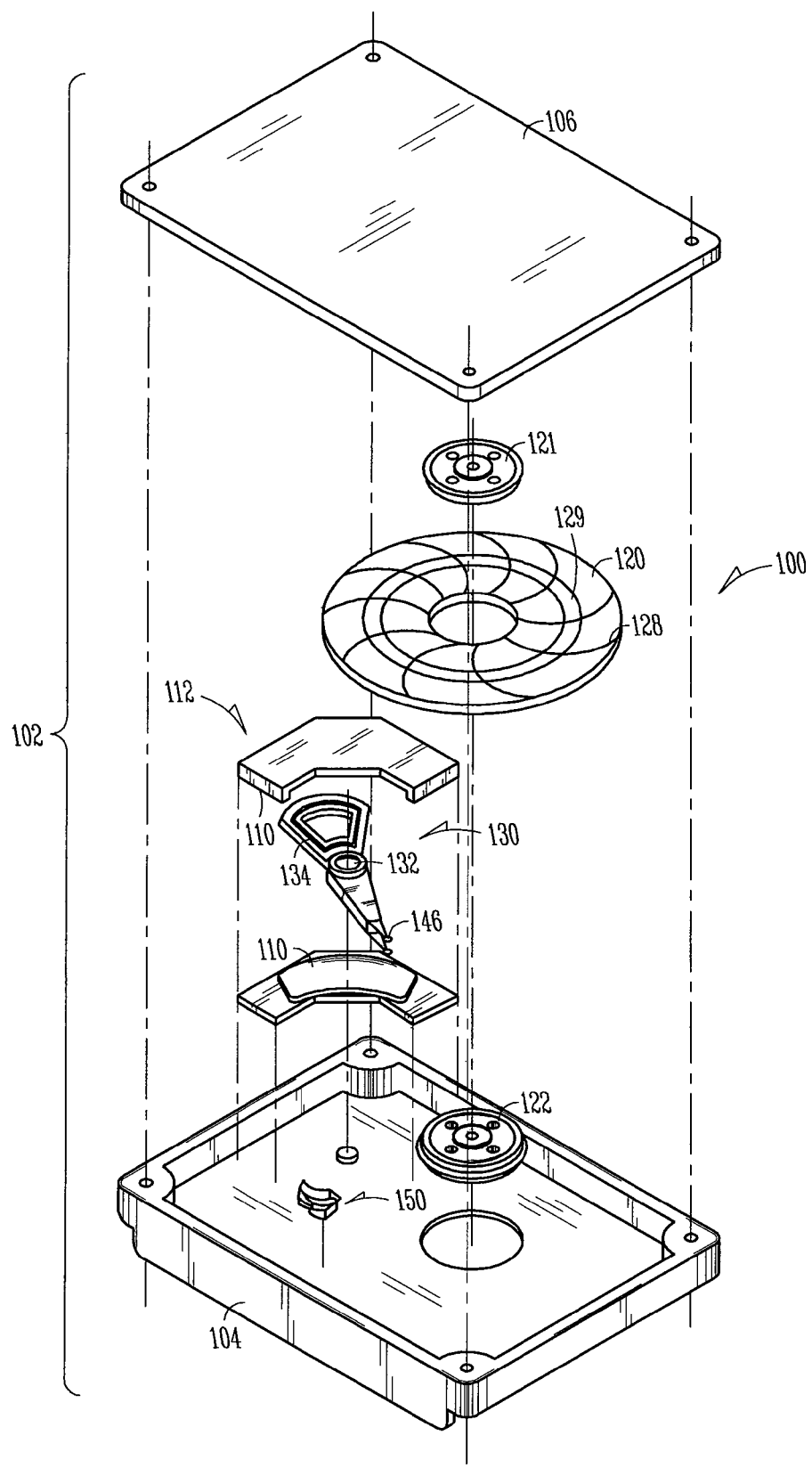
FIG. 1 is an exploded view of a disk drive that uses example embodiments described herein.

FIG. 1 is an exploded view of disk drive 100 that uses various embodiments of the present invention. The disk drive 100 includes a housing 102 including a housing base 104 and a housing cover 106. The housing base 104 illustrated is a base casting, but in other embodiments a housing base 104 can comprise separate components assembled prior to, or during assembly of the disk drive 100. A disk 120 is attached to a hub or spindle 122 that is rotated by a spindle motor. The disk 120 can be attached to the hub or spindle 122 by a clamp 121. The disk may be rotated at a constant or varying rate ranging from less than 3,600 to more than 15,000 revolutions per minute. Higher rotational speeds are contemplated in the future. The spindle motor is connected with the housing base 104. The disk 120 can be made of a light aluminum alloy, ceramic/glass or other suitable substrate, with magnetizable material deposited on one or both sides of the disk. The magnetic layer includes small domains of magnetization for storing data transferred through a transducing head 146. The transducing head 146 includes a magnetic transducer adapted to read data from and write data to the disk 120. In other embodiments, the transducing head 146 includes a separate read element and write element. For example, the separate read element can be a magneto-resistive head, also known as a MR head. It will be understood that configurations with multiple heads 146 can be used.

A rotary actuator 130 is pivotally mounted to the housing base 104 by a bearing 132 and sweeps an arc between an inner diameter (ID) of the disk 120 and a ramp 150 positioned near an outer diameter (OD) of the disk 120. Attached to the housing 104 are upper and lower magnet return plates 110 and at least one magnet that together form the stationary portion of a voice coil motor (VCM) 112. A voice coil 134 is mounted to the rotary actuator 130 and positioned in an air gap of the VCM 112. The rotary actuator 130 pivots about the bearing 132 when current is passed through the voice coil 134 and pivots in an opposite direction when the current is reversed, allowing for control of the position of the actuator 130 and the attached transducing head 146 with respect to the disk 120. The VCM 112 is coupled with a servo system that uses positioning data read by the transducing head 146 from the disk 120 to determine the position of the head 146 over one of a plurality of tracks on the disk 120. The servo system determines an appropriate current to drive through the voice coil 134, and drives the current through the voice coil 134 using a current driver and associated circuitry (not shown in FIG. 1).

Each side of a disk 120 can have an associated head 146, and the heads 146 are collectively coupled to the rotary actuator 130 such that the heads 146 pivot in unison. The invention described herein is equally applicable to devices wherein the individual heads separately move some small distance relative to the actuator. This technology is referred to as dual-stage actuation (DSA).

One type of servo system is an embedded, servo system in which tracks on each disk surface used to store information representing data contain small segments of servo information. The servo information, in some embodiments, is stored in radial servo sectors or servo wedges 128 shown as several narrow, somewhat curved spokes substantially equally spaced around the circumference of the disk 120. It should be noted that in actuality there may be many more servo wedges than as shown in FIG. 1.

The disk 120 also includes a plurality of tracks on each disk surface. The plurality of tracks is depicted by two tracks, such as track 129 on the surface of the disk 120. The servo wedges 128 traverses the plurality of tracks, such as track 129, on the disk 120. The plurality of tracks, in some embodiments, may be arranged as a set of substantially concentric circles. Data is stored in fixed sectors along a track between the embedded servo wedges 128. The tracks on the disk 120 each include a plurality of data sectors. More specifically, a data sector is a portion of a track having a fixed block length and a fixed data storage capacity (e.g. 512 bytes of user data per data sector). The tracks toward the inside of the disk 120 are not as long as the tracks toward the periphery of the disk 120. As a result, the tracks toward the inside of the disk 120 cannot hold as many data sectors as the tracks toward the periphery of the disk 120. Tracks that are capable of holding the same number of data sectors are grouped into data zones. Since the density and data rates vary from data zone to data zone, the servo wedges 128 may interrupt and split up at least some of the data sectors. The servo wedges 128 are typically recorded with a servo writing apparatus at the factory (called a servo-writer), but may be written (or partially written) with the transducing head 146 of disk drive 100 in a self-servowriting operation.

Figure 2:
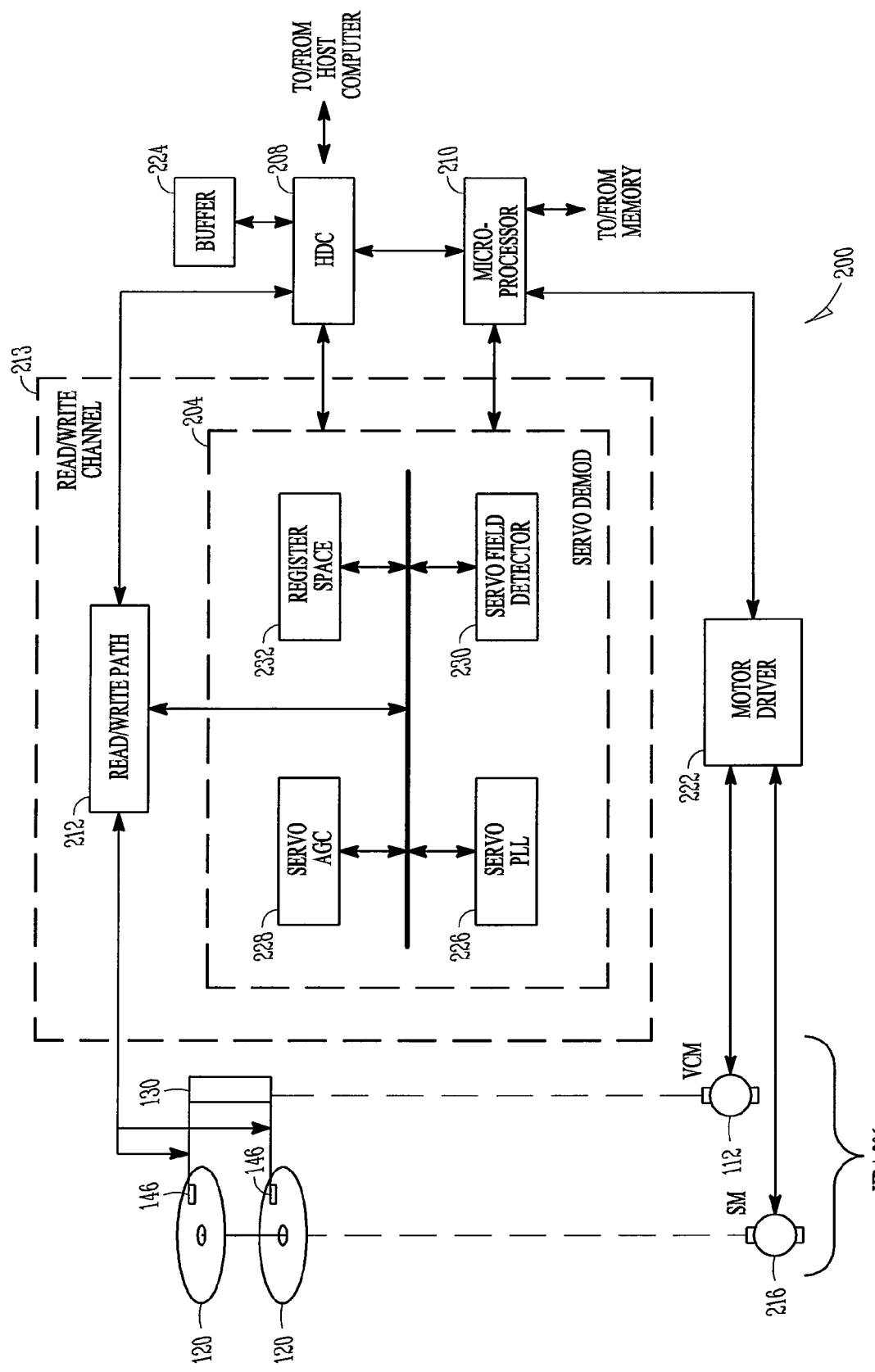
FIG. 2 is a schematic diagram of a disk drive and includes various electrical portions of the disk drive, according to an example embodiment.

The disk drive 100 not only includes many mechanical features and a disk with a servo pattern thereon, but also includes various electronics for reading signals from the disk 120 and writing information representing data to the disk 120. FIG. 2 is a schematic diagram of a disk drive 200 that more fully details some of example electronic portions of the disk drive 100, according to an example embodiment. Referring to FIG. 2, the disk drive device 200 is shown as including a head disk assembly (HDA) 206, a hard disk controller (HDC) 208, a read/write channel 213, a microprocessor 210, a motor driver 222 and a buffer 224. The read/write channel 213 is shown as including a read/write path 212 and a servo demodulator 204. The read/write path 212, which can be used to read and write user data and servo data, may include front end circuitry useful for servo demodulation. The read/write path 212 may also be used for writing servo information in self-servo writing. It should be noted that the disk drive 100 also includes other components, which are not shown because they are not necessary to explain the example embodiments.

The HDA 206 includes one or more disks 120 upon which data and servo information can be written to, or read from, by transducers or transducing heads 146. The voice coil motor (VCM) 112 moves an actuator 130 to position the transducing heads 146 on the disks 120. The motor driver 222 drives the VCM 112 and the spindle motor (SM) 216. More specifically, the microprocessor 210, using the motor driver 222, controls the VCM 112 and the actuator 130 to accurately position the heads 146 over the tracks (described with reference to FIGS. 1-3) so that reliable reading and writing of data can be achieved. The servo wedges 128, discussed above in the description of FIGS. 1-3, are used for servo control to keep the heads 146 on track and to assist with identifying proper locations on the disks 120 where data is written to or read from. When reading a servo wedge 128, the transducing heads 146 act as sensors that detect the position information in the servo wedges 128, to provide feedback for proper positioning of the transducing heads 146.

The servo demodulator 204 is shown as including a servo phase locked loop (PLL) 226, a servo automatic gain control (AGC) 228, a servo field detector 230 and register space 232. The servo PLL 226, in general, is a control loop that is used to provide frequency and phase control for the one or more timing or clock circuits (not shown in FIG. 2), within the servo demodulator 204. For example, the servo PLL 226 can provide timing signals to the read/write path 212. The servo AGC 228, which includes (or drives) a variable gain amplifier, is used to keep the output of the read/write path 212 at a substantially constant level when servo wedges 128 on one of the disks 120 are being read. The servo field detector 230 is used to detect and/or demodulate the various subfields of the servo wedges 128, including a SAM, a track number, a first phase servo burst, and a second phase servo burst. The microprocessor 210 is used to perform various servo demodulation functions (e.g., decisions, comparisons, characterization and the like), and can be thought of as being part of the servo demodulator 204. In the alternative, the servo demodulator 204 can have its own microprocessor.

One or more registers (e.g., in register space 232) can be used to store appropriate servo AGC values (e.g., gain values, filter coefficients, filter accumulation paths, etc.) for when the read/write path 212 is reading servo data, and one or more registers can be used to store appropriate values (e.g., gain values, filter coefficients, filter accumulation paths, etc.) for when the read/write path 212 is reading user data. A control signal can be used to select the appropriate registers according to the current mode of the read/write path 212. The servo AGC value(s) that are stored can be dynamically updated. For example, the stored servo AGC value(s) for use when the read/write path 212 is reading servo data can be updated each time an additional servo wedge 128 is read. In this manner, the servo AGC value(s) determined for a most recently read servo wedge 128 can be the starting servo AGC value(s) when the next servo wedge 128 is read.

The read/write path 212 includes the electronic circuits used in the process of writing and reading information to and from disks 120. The microprocessor 210 can perform servo control algorithms, and thus, may be referred to as a servo controller. Alternatively, a separate microprocessor or digital signal processor (not shown) can perform servo control functions.

Typically in a normal seek, as much current as possible is driven to maximize performance. However, in one embodiment, a fixed, but relatively low current is driven through the voice coil motor during a seek, and servile data (data from the servo information read from the disk) is used to measure the velocity of the actuator. This allows an accurate estimate of the back EMF voltage, and hence the ability to calculate a correction factor for the voice coil motor resistance. The measurement may be done several different times, such as approximately four times in one embodiment to account for error factors such as hardware offsets.

In one embodiment, current is passed in both directions, or the seek may be performed across different sets of tracks as desired to obtain a more accurate correction factor.

Figure 3:
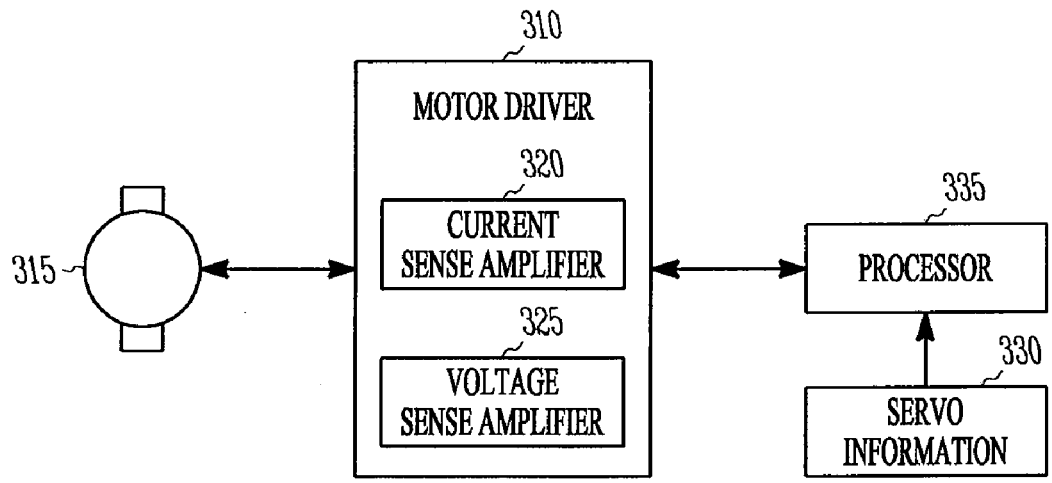
FIG. 3 is a block schematic diagram of a voice coil motor driver according to an example embodiment.

FIG. 3 is a block schematic diagram of a voice coil motor driver 310 according to an example embodiment. The voice coil motor driver 310 is coupled to a voice coil motor 315 for driving it at desired levels. The voice coil motor driver 310 includes a current sense amplifier 320 that senses current through the voice coil motor 315, and also includes a voltage sense amplifier 325 that senses voltage across the voice coil motor 315. These measurements provide an accurate value of voice coil motor resistance. A small back EMF voltage generated by the voice coil moving in the motor can be measured. This back EMF voltage is proportional to the voice coil motor velocity, which may also be measured from read servo information as indicated in block 330.

The voice coil motor resistance may be measured during a seek operation whereby correlation between the measured voice coil motor velocity via servo demodulation (see block 330) that determines data head radial position, and back EMF based velocity measured gives an estimate of voice coil motor resistance. This way, an accurate voice coil motor resistance can be determined during seek operations, allowing rapid and accurate head parking functions. Processing of the back EMF measurements may be performed by a processor 335 coupled to the motor driver 310 and the servo information (see block 330).

Figure 4:
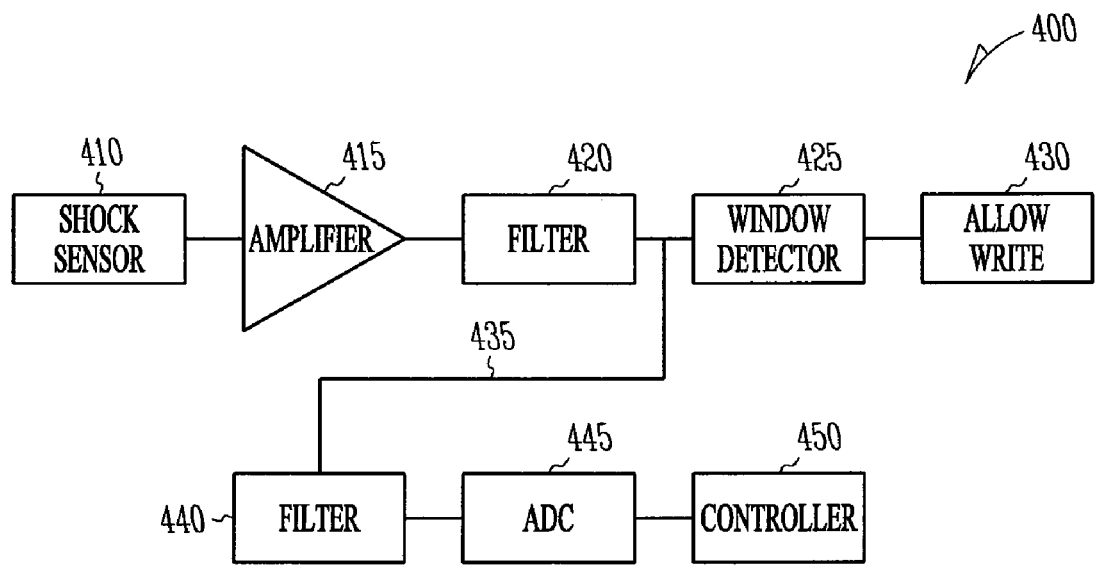
FIG. 4 is a block diagram of a shock channel according to an example embodiment.

FIG. 4 illustrates an example shock detection channel generally at 400. Shock detection channel 400 in one embodiment comprises a motor driver, such as an ASIC, in addition to a shock sensor 410. In one embodiment, the shock sensor channel 410 is internal to the ASIC. An example configuration uses the shock detection channel to detect sharp jerk events (mechanical shock) in order to inhibit write operation and protect adjacent track user data from corruption during disk write transfers. A quick detection of any jerk event helps prevent such corruption. In one embodiment, the detection channel 400 incorporates a piezoelectric shock sensor charge amplifier or other suitable amplifier 415 coupled to a first filter 420 and a window detector 425.

The piezoelectric shock sensor 410 may be a piezoelectric element attached to a charge amplifier (e.g., the amplifier 415) and generates a voltage or charge proportional to the applied force in an axis. The axis in one embodiment may be selected to be essentially 45° x, 45° y and 25° z. This provides the ability to react to any applied force on the drive in either the x, y or z axis. Z axis disturbances may not be as detrimental to disk drive performance, and may be detuned is some embodiments if desired.

In one embodiment, an output (see allow write 430) of the window detector 425 is used to allow write transfers to the disk when the signal is within a window where the magnitude of the detected forces is below some predetermined level, and inhibit write transfers when the detected forces are outside the window. In one embodiment, window detector 425 may be any type of controller that analyzes an input signal to determine whether or not to inhibit or allow writes. Simple thresholds may be used, or other algorithms that determine whether a shock event, as represented by the high frequency components may be detrimental to write operations.

A modification of the shock channel allows a second action to occur, which may occur simultaneously with the allowing or inhibiting of write transfers. The shock detection channel 400 provides a separate alternate signal path 435 to filter an output from the window detector 425. The separate alternate signal path 435 includes a second low pass filter 440 that presents a filtered signal to an ADC 445. ADC 445 is coupled to a controller 450, such as a firmware controller, to add a compensation signal to a position control loop. Thus, the shock in the separate path may be used to compensate for mechanical disturbances detected by the shock sensor 410. The frequency of the compensated disturbances may be substantially lower than the frequencies used to detect a shock event and prevent writes. Thus, in an example embodiment, the filter 440 is a low pass type that rejects noise inherent in the shock detection channel 400. This additional filter does not degrade the performance of the shock channel in quickly detecting shocks, as it is in a separate path. Yet, it allows a reduced bandwidth shock signal to be applied to the position controller to compensate for external forces applied to the drive without large amounts of high frequency noise. This allows continued accurate writing in a track.

The first filter 420, may be a high pass filter (such as around 1 KHz to 20 KHz for example, which in one embodiment may be modified during operation), and is used to detect shocks that trigger a write inhibit function to prevent writing over data on adjacent tracks on a disk surface. The second filter 440 is added after the first filter and may be a low pass filter in the realm of 1 KHz to 4 KHz, that allows correction to the actuator to accommodate induced vibration and applied vibration. The first and second filters 420, 440 may also be implemented as band pass filters, allowing appropriate frequency signals to pass corresponding to the functions implemented in the paths. Analog or digital filters may be used as desired. In one embodiment, both filters are analog filters.

It should be noted that the frequency response of the shock sensor in an example embodiment is actually quite wide. Thus, a significant amount of noise is introduced, because the sensor can actually act like a microphone. Even loud noises will be picked up.

Figure 5:
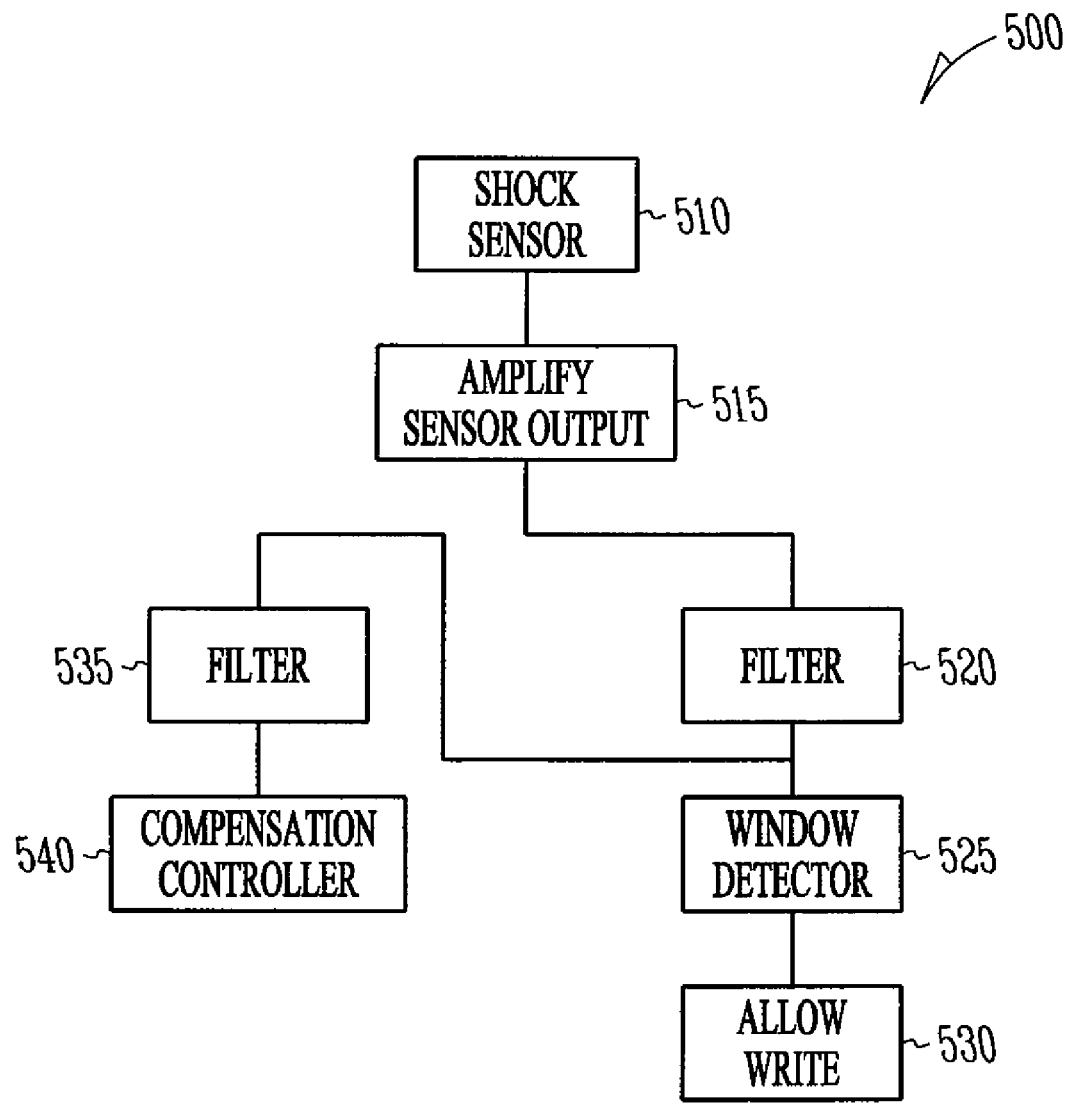
FIG. 5 is a flow diagram illustrating dual shock channel paths and corresponding control actions in each path according to an example embodiment.

FIG. 5 is a flow diagram 500 illustrating a method of processing of shock sensor output to provide separate write inhibit or shock compensation controls. At 510, a shock is sensed, such as by a shock sensor and an output of the sensor is amplified at 515. One path of the amplified sensor output is filtered at 520 to allow passage of a signal representing higher frequency shock forces that may result in writing of data on adjacent tracks. The filtered output is then detected by a window detector at 525 to either allow a write at 530 if the filtered output is within the window, or inhibit the write if the filtered output is outside the window.

A second path of the amplified sensor output 515 is filtered at 535 to allow passing of lower frequency shock forces that can be compensated for during writes to ensure that data is properly written in the data or other information tracks. A filtered signal from 535 is provided to a compensation controller 540 to compensate for such lower frequency shock forces during writes. In one embodiment, the shock signal represents a force which would cause the head to deviate in one direction from the track during a write. This deviation may be derived from the signal, and control current may be applied to bring the write head back onto the track, or keep it from leaving the track in the first place.

Figure 6:
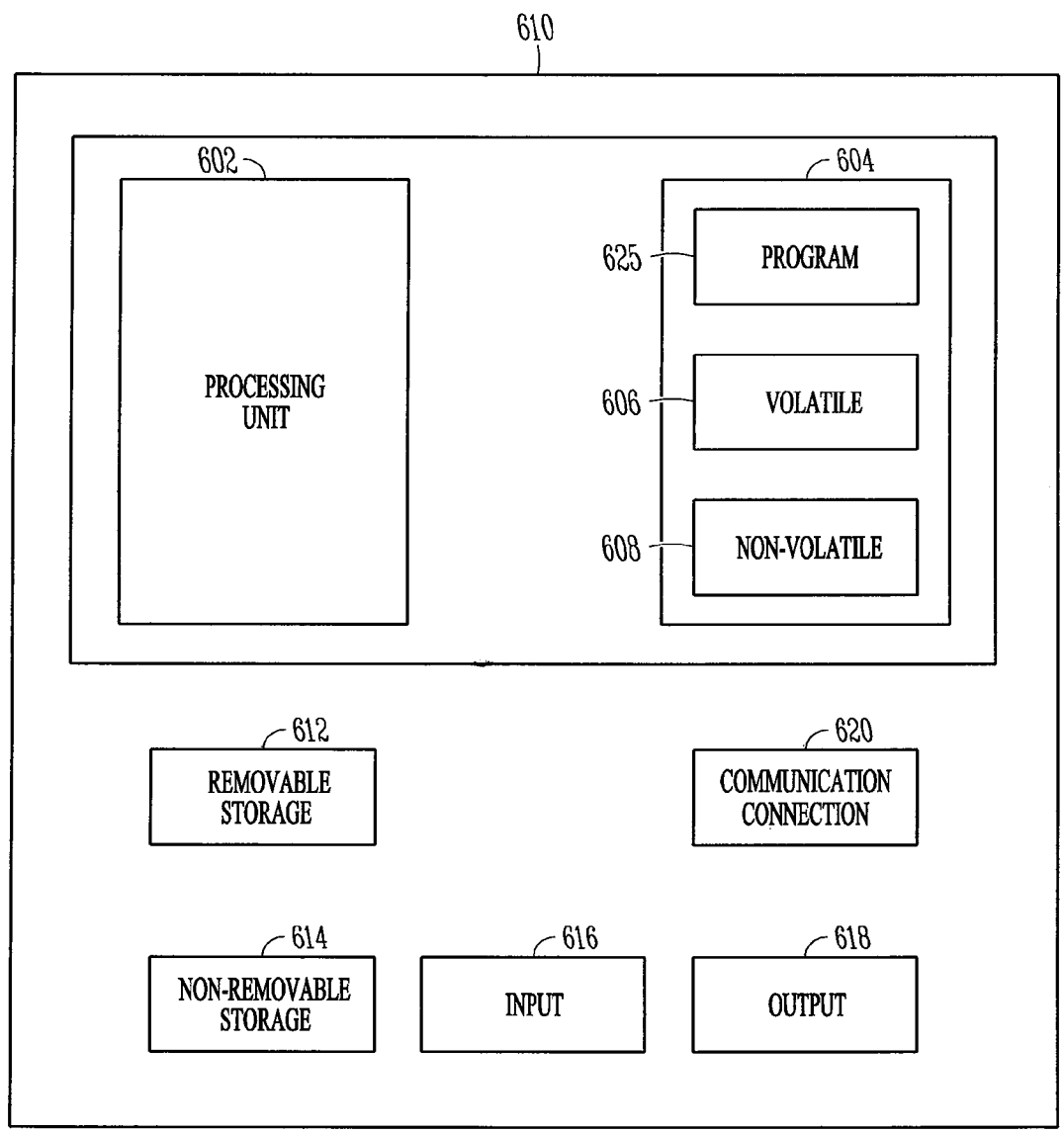
FIG. 6 is an example block diagram of a computer system for implementing functions and controllers described in accordance with example embodiments.

A block diagram of a computer system that executes programming for performing the above algorithm is shown in FIG. 6. A general computing device in the form of a computer 610, may include a processing unit 602, memory 604, removable storage 612, and non-removable storage 614. Memory 604 may include volatile memory 606 and non volatile memory 608. Computer 610 may include—or have access to a computing environment that includes—a variety of computer-readable media, such as volatile memory 606 and non volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. The microprocessor 210 or other selected circuitry or components of the disk drive may be such a computer system.

Computer-readable instructions stored on a computer-readable medium are executable by the processing unit 602 of the computer 610. A hard drive, CD-ROM, and RAM are some examples of articles including a computer-readable medium. For example, a computer program 625 executed to control the writing of information associated with successive flush cache commands from a host 440 according to the teachings of the present invention may be included on a CD-ROM and loaded from the CD-ROM to a hard drive. The computer program may also be termed firmware associated with the disk drive. In some embodiments, a copy of the computer program 625 can also be stored on the disk 120 of the disk drive.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method comprising:
   detecting mechanical shocks to a disk drive device to provide a shock output signal representative of such mechanical shocks;
   filtering the shock output signal to pass signals having a relatively high frequency component, the passed signals provided to a window detector;
   filtering the shock output signal to pass signals having a low frequency component of less than 4 KHz;
   inhibiting write operations of the disk drive device responsive to receiving the signals having the high frequency component; and
   compensating for low frequency mechanical disturbances during writing to a track on the disk drive device responsive to receiving the signals having the low frequency component, wherein control of the inhibiting and control of the compensating are performed substantially in parallel.

2. The method of claim 1 wherein the shock output signal is provided by a piezoelectric shock sensor.

3. The method of claim 2 wherein the shock output signal of the shock sensor is a voltage or charge proportional to applied force in an axis.

4. The method of claim 3 wherein the axis is approximately 45°x, 45°y and 25°z.

5. The method of claim 1 further comprising inhibiting the write operations if the signals having the high frequency component are outside a window of the window detector.

6. A method comprising:
   detecting mechanical shocks to a disk drive device to provide a shock output signal representative of such mechanical shocks;
   filtering the shock output signal to pass signals having a relatively high frequency component, the passed signals provided to a window detector;
   filtering the shock output signal to pass signals having a low frequency component of less than 4 KHz;
   inhibiting write operations if the signals having the high frequency component are outside a window of a window detector; and
   compensating for low frequency mechanical disturbances during the write operations to a track on the disk drive device as a function of such low frequency component, wherein control of the inhibiting and control of the compensating are performed substantially in parallel.

7. The method of claim 6 wherein the shock output signal is provided by a piezoelectric shock sensor.

8. The method of claim 7 wherein the output signal of the shock sensor is a voltage or charge proportional to applied force in an axis.

9. A disk drive device comprising:
   a sensor that detects mechanical shocks to the disk drive device to provide a shock output signal representative of such mechanical shocks;
   a first filter coupled to the sensor that filters the shock output signal to pass signals having a relatively high frequency component;
   a window detector that inhibits write operations of the disk drive device responsive to receiving the signals having the relatively high frequency component;
   a second filter coupled to the sensor that filters the shock output signal to pass signals having a low frequency component of less than 4 KHz; and
   a controller coupled to the second filter that compensates for low frequency mechanical disturbances during the write operations to a track on the disk drive device as a function of such low frequency component, wherein the window detector inhibits and the controller compensates substantially in parallel.

10. The device of claim 9 wherein the sensor comprises a piezoelectric shock sensor.

11. The device of claim 10 wherein the output signal of the shock sensor is a voltage or charge proportional to applied force in an axis.

12. The device of claim 11 wherein the axis is approximately 45°x, 45°y and 25°z.

13. The device of claim 9 wherein the window detector inhibits the write operations if the signals having the high frequency component are outside a window of the window detector.

14. A disk drive device comprising:
   a sensor that detects mechanical shocks to the disk drive device to provide a shock output signal representative of such mechanical shocks;
   a first filter coupled to the sensor that passes relatively high frequency components of the shock output signal;
   a first controller that inhibits write operations of the disk drive device using a window detector and responsive to the high frequency components of the shock output signal;
   a second filter coupled to the sensor that filters the shock output signal to pass signals having a low frequency component of less than 4 KHz; and
   a second controller coupled to the second filter that compensates for low frequency mechanical disturbances during writing to a track on the disk drive device as a function of such low frequency components, wherein the first controller is to operate substantially in parallel with the second controller.

15. The device of claim 14 further comprising an amplifier coupled between the shock sensor and the first and second filters.

16. A disk drive device comprising:
   means for detecting mechanical shocks to the disk drive device to provide a shock output signal representative of such mechanical shocks;
   means for inhibiting write operations of the disk drive device responsive to relatively high frequency components of the shock output signal; and
   means for compensating for low frequency mechanical disturbances during writing to a track on the disk drive device responsive to low frequency components of the shock output signal, the low frequency components being less than 4 KHz, wherein the means for inhibiting and the means for compensating are performed substantially in parallel.

* * * * *